United States Patent
Jang

(10) Patent No.: US 9,524,598 B2
(45) Date of Patent: Dec. 20, 2016

(54) SECURITY SYSTEM AND METHOD FOR CONTROLLING ENTRANCE/EXIT USING BLOCKING AISLE

(71) Applicant: Jae-Sung Jang, Seoul (KR)

(72) Inventor: Jae-Sung Jang, Seoul (KR)

( * ) Notice: Subject to any disclaimer, the term of this patent is extended or adjusted under 35 U.S.C. 154(b) by 0 days.

(21) Appl. No.: 14/905,671

(22) PCT Filed: Sep. 25, 2013

(86) PCT No.: PCT/KR2013/008577
§ 371 (c)(1),
(2) Date: Jan. 15, 2016

(87) PCT Pub. No.: WO2015/037772
PCT Pub. Date: Mar. 19, 2015

(65) Prior Publication Data
US 2016/0171805 A1   Jun. 16, 2016

(30) Foreign Application Priority Data
Sep. 12, 2013 (KR) .................. 10-2013-0109785

(51) Int. Cl.
*G06K 9/00* (2006.01)
*G07C 9/00* (2006.01)
*G07C 9/02* (2006.01)
*H04N 7/18* (2006.01)
*G08B 13/196* (2006.01)

(52) U.S. Cl.
CPC ....... *G07C 9/00158* (2013.01); *G06K 9/00288* (2013.01); *G07C 9/02* (2013.01); *G08B 13/196* (2013.01); *G08B 13/19645* (2013.01); *H04N 7/181* (2013.01)

(58) Field of Classification Search
CPC ............. G06K 9/00288; G08B 13/196; G08B 13/19645; H04N 7/181
See application file for complete search history.

(56) References Cited

U.S. PATENT DOCUMENTS

| 3,965,827 A | 6/1976 | Reeves |
| 2002/0132663 A1* | 9/2002 | Cumbers ............ G06K 9/00288 463/25 |

(Continued)

FOREIGN PATENT DOCUMENTS

| KR | 20-2001-0001321 | 1/2001 |
| KR | 10-0419957 | 2/2004 |

(Continued)

OTHER PUBLICATIONS

International Search Report mailed May 27, 2014 for PCT/KR2013/008577.

(Continued)

*Primary Examiner* — Stephen R Koziol
*Assistant Examiner* — Timothy Choi

(57) ABSTRACT

A security entrance and exit control system includes a pair of protective walls and a ceiling for forming an aisle, an entrance door and an exit door, a plurality of entrance cameras, an entrance display, an entrance speaker, an infrared sensor, an aisle light, an aisle speaker, an aisle camera, and a control computer which compares an image of the face photographed by the entrance cameras with an image of a list provided in real time from a DB server.

2 Claims, 3 Drawing Sheets

(56) References Cited

U.S. PATENT DOCUMENTS

| | | | | |
|---|---|---|---|---|
| 2003/0196097 A1* | 10/2003 | Korosec | .................. | G06Q 20/04 713/185 |
| 2007/0122011 A1* | 5/2007 | Takizawa | ........... | G07C 9/00158 382/118 |
| 2009/0128284 A1* | 5/2009 | Floyd | ....................... | G07C 9/02 340/5.3 |
| 2010/0033572 A1* | 2/2010 | Trela | ..................... | G07B 15/00 348/152 |
| 2010/0280958 A1* | 11/2010 | Hasson | .................. | G06Q 20/40 705/75 |
| 2010/0308108 A1* | 12/2010 | Choi | ........................ | G07C 9/02 235/382 |
| 2011/0277518 A1* | 11/2011 | Lais | ................... | G07C 9/00087 70/101 |

FOREIGN PATENT DOCUMENTS

| | | |
|---|---|---|
| KR | 10-2005-0047272 | 5/2005 |
| KR | 10-0643670 | 11/2006 |
| KR | 10-2010-0055601 | 5/2010 |
| KR | 10-1017588 | 2/2011 |
| KR | 10-1046655 | 7/2011 |

OTHER PUBLICATIONS

Korean Office Action dated Oct. 30, 2014 corresponding to Korean Patent Application No. 10-2013-0109785.

\* cited by examiner

SECURITY SYSTEM AND METHOD FOR CONTROLLING ENTRANCE/EXIT USING BLOCKING AISLE

This application claims the priority of Korean Patent Application No. 10-2013-0109785, filed on Sep. 12, 2013 in the KIPO (Korean Intellectual Property Office), the disclosure of which is incorporated herein entirely by reference. Further, this application is the National Stage application of International Application No. PCT/KR2013/008577, filed Sep. 25, 2013, which designates the United States and was published in Korean. Each of these applications is hereby incorporated by reference in their entirety into the present application.

TECHNICAL FIELD

The present disclosure relates to a security system and method for controlling entrance and exit, and more specifically, to a security system and method for controlling entrance and exit using a blocking aisle.

BACKGROUND ART

Conventional gate control system, i.e., conventional security entrance and exit system uses a variety of verification techniques which mainly include credit card or RF security card, face recognition, iris recognition, fingerprint recognition, and so on.

That is, it is configured to allow access of only those who are previously registered to corresponding facilities or buildings. Accordingly, it is configured such that a credit card or an RF security card is previously issued, or biometric information such as face, iris or fingerprint is previously registered for the purpose of entrance verification process.

Korean Registered Patents Nos. 10-0419957, 10-0643670, 10-1017588 all propose configurations to control entrance and exit using personal information of a previously-registered user. All these pieces of information share the common characteristic that these are used for the purpose of controlling entrance and exit of those who are allowed to access buildings or facilities.

However, many other facilities can have users who are not allowed an access thereto.

For example, airport terminals, port entrances and exits, or train stations are places where unspecified masses frequently enter and exit. These are facilities where several tens of thousands floating population can pass in only one day. Further, the public office such as the central government complex is one of these examples.

In this case, it is not possible to register people who are authorized to enter and exit the corresponding facility. In place like airport, the focus is rather on finding those who appear suspicious or in possession of a dangerous substance.

However, in such places, it is more important to block access of people such as persistent offenders, international terrorists, or drug criminals.

That is, for places where access of unspecified masses frequently occurs, it is more important to block or control those who can harm, rather than allowing access of users based on registration.

However, the gates of these facilities are not equipped with proper systems to block security risk, and even when a dangerous character is found, there is a problem that effective control, arrest or isolation of the dangerous character is not ensured.

That is, conventionally, there is no efficient search means or efficient blocking and arrest means.

PRIOR ART REFERENCES

Patent Documents (Patent document 1) KR10-0419957
(Patent document 2) KR10-0643670
(Patent document 3) KR10-1017588

DISCLOSURE OF THE INVENTION

Technical Problem

An object of the present disclosure is to solve the problems mentioned above, and accordingly, it is an object of the present disclosure to provide a security entrance and exit control system using a blocking aisle.

Another object of the present disclosure is to provide a security entrance and exit control method using a blocking aisle.

Technical Solution

In order to achieve the objects of the present disclosure, a security entrance and exit control system using a blocking aisle is provided.

The security entrance and exit control system may be installed at an entrance of any one of airport, harbor, train station, public office, and military facility, and may include a pair of protective walls and a ceiling for forming an aisle which is 2.0 m-5.0 m in length; an entrance door and an exit door provided at both ends of the aisle; a plurality of entrance cameras provided at the entrance of the aisle so as to photograph a face of a visitor attempting to enter the entrance, in a front direction and in both side directions at a 15 degree angle; an entrance display provided at the entrance of the aisle so as to output an instruction prepared in advance to control behaviors of the visitor; an entrance speaker provided at the entrance of the aisle so as to output the displayed instruction as a voice; an infrared sensor provided at the entrance of the aisle so as to sense that the visitor has entered the entrance; an aisle light provided on the inner side of the ceiling; an aisle speaker provided on the inner side of the ceiling so as to output a voice of a user; an aisle camera provided on the inner side of the ceiling so as to photograph the visitor inside the aisle; and a control computer which compares an image of the face photographed by the entrance cameras with an image of a list provided in real time from a DB server, provides an alarm to the user if the photographed image is consistent with a predetermined image of the list by 60% or more according to the comparison result, controls such that the entrance door and the exit door close when it is sensed by the infrared sensor that the visitor enters the entrance if the photographed image is consistent with the predetermined image by 75% or more according to the comparison result, and displays, on a display, an image of the visitor photographed by the aisle camera such that the user monitors the face and the behaviors of the visitor.

The entrance door may preferably be formed from steel plate or reinforced plastics.

Preferably, the exit door may be formed from reinforced plastics, reinforced glass or bulletproof glass, and preferably tinted so that one outside the aisle sees inside the aisle, while one inside the aisle does not see outside the aisle.

Further, the list may include at least one of criminals, terrorists, and most wanted criminals.

Meanwhile, the control computer may analyze the image of the face of the visitor photographed by the entrance camera and when determining as a result of the analysis that the visitor is wearing a hat or sunglasses or inclining his/her head, may control the entrance display and the entrance speaker to output an instruction directing to take off the hat or the sunglasses or raise head, and control the entrance camera to secondly photograph the face of the visitor.

According to another exemplary embodiment, a security entrance and exit control method using a blocking aisle is provided, according to which the blocking aisle is installed at an entrance of any one of airport, harbor, train station, public office, and military facility, and the method may include controlling, at a control computer, an entrance camera provided at an entrance of the aisle to photograph a face of a visitor attempting to enter the entrance, in a front direction and in both side directions at a 15 degree angle, controlling, at the control computer, an entrance display and an entrance speaker provided at the entrance of the aisle so as to output an instruction prepared in advance to control behaviors of the visitor, respectively, comparing, at the control computer, an image of the face photographed by the entrance cameras with an image of a list provided in real time from a DB server to determine if the photographed image is consistent by 60% or more, and by 75% or more, when the image of the face photographed by the entrance cameras is consistent with a predetermined image of the list by 60% or more, providing, by the control computer, an alarm to the user, sensing, at an infrared sensor provided at the entrance of the aisle, that the visitor enters the entrance, when the visitor enters the entrance according to the instruction outputted from the entrance speaker, when the image photographed by the entrance camera is consistent with the predetermined image of the list by 75% or more, and when sensing, by the infrared sensor, that the visitor enters the entrance, closing an entrance door and an exit door according to control of the control computer before the visitor exists the aisle, photographing, at an aisle camera provided on an inner side of a ceiling of the aisle, the visitor under control of the control computer, and displaying, at the control computer, an image of the visitor photographed by the aisle camera such that the user monitors the face and the behaviors of the visitor.

The aisle is configured to a length of 2.0 m-5.0 m by a pair of protective walls and a ceiling, and the entrance door and the exit doors may be provided at both ends of the aisle.

The ceiling may further include an aisle light and an aisle speaker which outputs a voice of a user, on an inner side.

The entrance door may be formed from steel plate or reinforced plastics.

The exit door may be formed from reinforced plastics, reinforced glass or bulletproof glass, and preferably tinted so that one outside the aisle sees inside the aisle, while one inside the aisle does not see outside the aisle.

The list may preferably include at least one of criminals, terrorists, and most wanted criminals.

Meanwhile, the controlling, at the control computer, the entrance camera and the entrance speaker provided at the entrance of the aisle so as to output the instruction prepared in advance to control the behaviors of the visitor, respectively may include analyzing, at the control computer, the image of the face of the visitor photographed by the entrance camera and when determining as a result of the analysis that the visitor is wearing a hat or sunglasses or inclining his/her head, controlling the entrance display and the entrance speaker to output an instruction directing to take off the hat or the sunglasses or raise head, and controlling the entrance camera to secondly photograph the face of the visitor.

Advantageous Effects

According to the security entrance and exit control system and method using a blocking aisle as described above, the blocking aisle is formed at an entrance using protective walls, ceiling, entrance door and exit door so that a security risk on a list is searched in real time basis by facial recognition and when found, arrested inside the blocking aisle. Accordingly, an effect of blocking the security risk from accessing national infrastructure or facility for personal use, is provided.

Unlike the other conventional technologies, since a security risk can be blocked from access or be arrested conveniently, an effect of performing access control efficiently with a small number of human resources is provided. Further, it is possible to preempt reoccurrence of crime, by isolating a security risk or unauthorized person from the other people in advance.

Further, it is possible to preempt access of a security risk in advance, because dangerous characters are more reluctant to access the facility when there is the security entrance and exit control system using the blocking aisle as described above.

MODE FOR CARRYING OUT THE INVENTION

Figure 1:
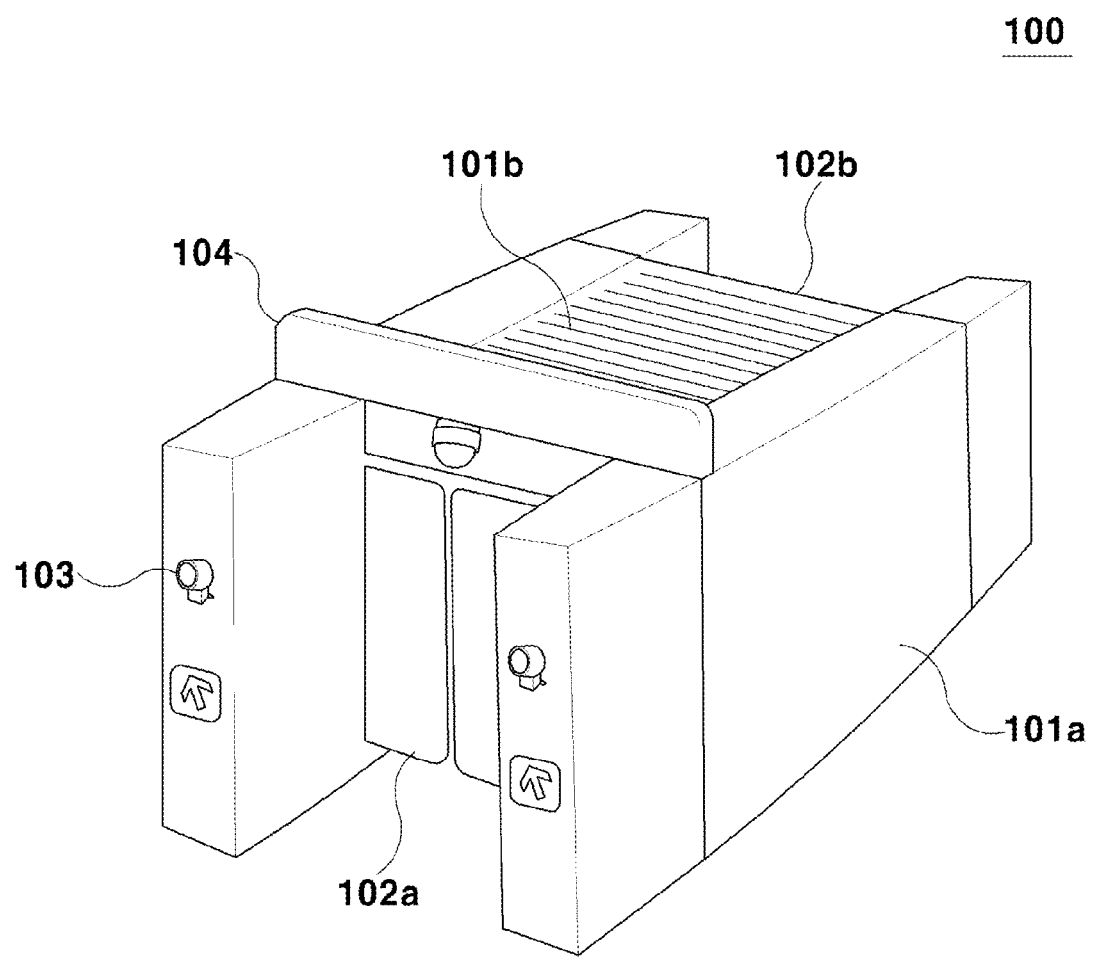
FIG. 1 is a perspective view of a security entrance and exit control system using a blocking aisle according to an exemplary embodiment.

The preferred embodiments will be explained in greater detail below with reference to the drawings attached hereto. The embodiments of the present disclosure may have a variety of modifications.

However, the scope of the present disclosure should not be limited to the embodiments described in detail below. The embodiments are should be construed as encompassing all the modifications, equivalents or substitutes falling under the concept and technical scope of the present disclosure.

In describing the drawings, the like reference numerals are used to refer to similar elements.

The expression such as "first", "second", "A", or "B" may be used to describe a variety of elements, but the elements should not be limited to the expressions. The expressions are used only for the purpose of distinguishing one element from another.

For example, without departing from the scope of the present disclosure, a first element may be named as a second element, and likewise, a second element may be named as a first element. The expression "and/or" encompasses any one of a combination of a plurality of associated items as described, and a plurality of associate items as described.

When it is stated that a certain element is "connected" or "accessed" to another element, it should be understood that the certain element may be directly connected or accessed to another element, but may also have yet another element intervening therebetween.

In contrast, when an element is stated as being "directly connected to" or "directly accessed to" another element, it should be understood that there is no other element present in between.

The terminology used herein is provided only to describe certain exemplary embodiments, and not to be construed as limiting the present disclosure. A singular expression encompasses a plural expression, unless specified to the contrary.

It should be understood that the term "comprise" or "include" as used herein refers to a presence of characteristic, number, step, operation, element, part, or a combination of these, but not to foreclose the existence of, or possibility of adding one or more of another characteristics, numbers, steps, operations, elements, parts or a combination of these.

Unless otherwise defined, the entire terminology including technical or scientific terms used herein has the same meaning as generally appreciated by those with ordinary knowledge in the technical field of the present disclosure.

The terms defined in generally-used dictionaries will have to be interpreted to have a meaning in agreement with the corresponding context of the associated technology, and unless otherwise defined clearly herein, should not be interpreted to have an idealistic or excessively formalistic meaning.

Herein below, certain exemplary embodiments of the present disclosure will be described in detail with reference to accompanying drawings.

FIG. 1 is a perspective view of a security entrance and exit control system using a blocking aisle according to an exemplary embodiment.

Referring to FIG. 1, an appearance of a security entrance and exit control system 100 using a blocking aisle according to an exemplary embodiment (herein below, 'security entrance and exit control system') is shown.

The security entrance and exit control system 100 may be installed at an entrance. It is configured for advantageous use at a place where unspecified masses frequently enter and exit, such as, an airport terminal, a harbor entrance and exit, a public office such as central government complex or the residence of the president (e.g., the Blue House).

Additionally, the system may be advantageously used in military facilities, large-sized places of business, convention center, schools, kindergartens, and so on.

The security entrance and exit control system 100 is configured such that one blocking aisle is formed at an entrance by forming a longitudinal aisle at the entrance with a pair of protective walls 101a and a ceiling 101b covering the same, and an entrance door 102a and an exit door 102b on both ends of the longitudinal aisle.

An entrance camera 103 provided at the entrance photographs faces of visitors, and compares with photographs of security risk list provided in real-time basis and finds out the security risk rapidly and accurately.

The security risk list may be provided from a DB server in advance or provided in real time, and may be configured to include various information including not only serious criminals, terrorists, drug criminals, sex offenders, but also those who are not allowed to leave the country, most wanted criminals, and so on. The information on terrorists, drug criminals, those who are not allowed to leave the country, the most wanted criminals and so on may be very useful at the airport terminals or harbor entrances and exits, and the terrorist information may be useful also at the central government complex or the Blue House. Further, the sex offender information may be advantageously used at schools, kindergartens, and so on.

When finding one consistent with the dangerous character rapidly as described above, and if possibility is high that he or she is the dangerous character, once the found character is guided to enter into the blocking aisle, he or she is locked in the blocking aisle by rapidly closing the entrance door and the exit door of the blocking aisle. Accordingly, it is highly efficient because the dangerous character is arrested rapidly and safely, and without requiring management staff by automatically performing accepting/denying access.

Meanwhile, entrance or exit of a dangerous character can be prevented in advance at an entrance equipped with the security entrance and exit control system 100.

Figure 2:
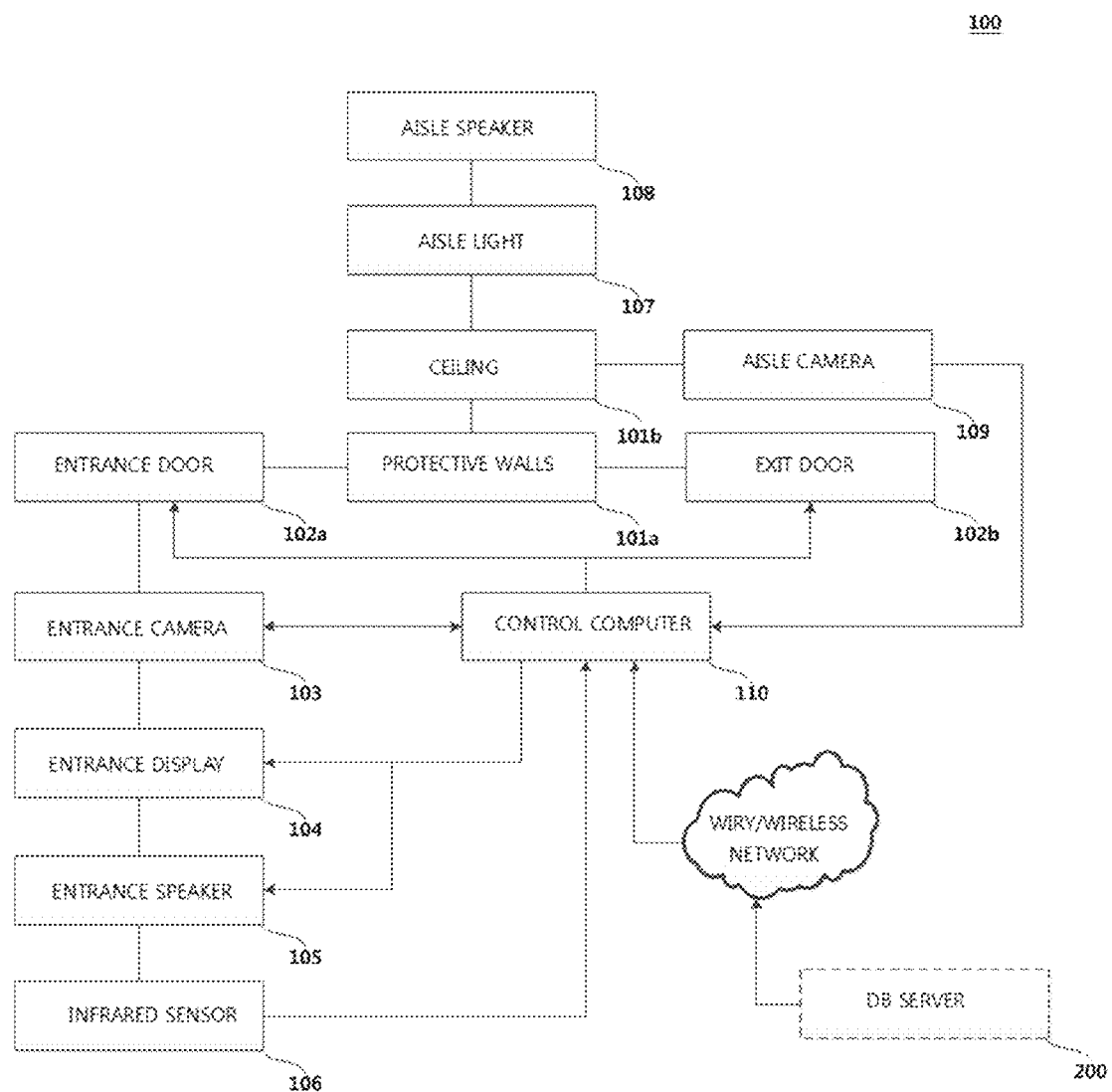
FIG. 2 is a block diagram of a security entrance and exit control system using a blocking aisle according to an exemplary embodiment.

FIG. 2 is a block diagram of a security entrance and exit control system using a blocking aisle according to an exemplary embodiment.

Referring to FIG. 2, the security entrance and exit control system 100 using a blocking aisle according to an exemplary embodiment may include a protective wall 101a, a ceiling 101b, an entrance door 102a, an exit door 102b, an entrance camera 103, an entrance display 104, an entrance speaker 105, an infrared sensor 106, an aisle light 107, an aisle speaker 108, an aisle camera 109, and a control computer 110.

The specific configuration will be described in below.

A pair of protective walls 101a may be provided, which are configured to have a length from 2.0 m to 5.0 m, and a height of 1.8 m to 2.2 m.

A certain length of the protective walls 101a is ensured so as to lock a dangerous character in the blocking aisle with reliability.

The ceiling 101b is provided over the pair of protective walls 101a to form an aisle in cooperation with the protective walls 101a.

The protective walls 101a and the ceiling 101b are preferably formed from a reinforcing material such as steel plate or reinforced plastics.

The entrance door 102a and the exit door 102b may be provided on both ends of the aisle which is formed by the protective walls 101a and the ceiling 101b.

The height of the entrance door 102a and the exit door 102b is preferably between 1.8 m and 2.2 m.

The entrance door 102a is preferably formed from steel plate or reinforced plastics.

The entrance door 102a is preferably formed from an opaque material which does not allow people at the entrance from seeing inside the aisle. This is because a dangerous character, when locked in the aisle, is preferably not seen by the other people.

Further, the exit door 102b is preferably formed from reinforced plastics, reinforced glass or bulletproof glass.

Meanwhile, the exit door 102b is preferably tinted so that those outside the aisle see inside the aisle, while those inside the aisle do not see outside the aisle.

It is desirable that, a dangerous character, who may be locked in the aisle, cannot see outside the aisle, while those outside the aisle should see inside the aisle easily in order to control and arrest the dangerous character.

On the other hand, the entrance door 102a and the exit door 102b are preferably configured to have 3 cm or shorter distance from the ceiling 101b and the bottom, respectively.

Further, the entrance door 102 and the exit door 102b are preferably configured so as to be opened and closed automatically or by hands, using a separate opening and closing switch (not illustrated).

The entrance camera 103 is provided at an entrance of the aisle and it is configured to photograph a face of a visitor attempting to enter the entrance in a front direction, and at an angle of 15 degrees from both sides.

To perform photographing in the front direction and both side directions, there may be a plurality of entrance cameras 103.

The entrance cameras 103 may include a center camera to recognize a frontal face, and left and right cameras to recognize sides of the face at an angle of 15-30 degrees.

The entrance display 104 may be provided at the entrance of the aisle and may be configured to output instruction prepared in advance to control behaviors of a visitor.

The "instruction prepared in advance" as used herein includes greeting such as "Hello" or "Welcome", and utterance such as "Please stand in waiting line", "Enter, please", and so on.

Meanwhile, the instruction may include "Please take off your hat", "Please take off your sunglasses", and so on, when a photographed image of a visitor at the entrance camera 103 is wearing a hat or sunglasses.

The entrance speaker 105 is provided at the entrance of the aisle and configured to output the instruction displayed on the entrance display 104 in a voice form. The output of the entrance speaker 105 and the output of the entrance display may preferably outputted in synchronization with each other.

The infrared sensor 106 is provided at the entrance of the aisle and configured to sense the visitor entering the entrance.

The infrared sensor 106 may be provided inside the aisle, i.e., on an inner side of the protective walls 101a or on an inner side of the ceiling 101b toward the entrance direction.

The aisle light 107 may be provided on an inner side of the ceiling 101b. The aisle light 107 may be configured to turn on upon closing of the aisle.

The aisle speaker 108 may be provided on an inner side of the ceiling 101b and configured to output a voice of a user. When the aisle is closed, the user may control a potential dangerous character locked in the aisle through the aisle speaker 108.

The aisle camera 109 may be provided on the inner side of the ceiling 101b.

The aisle camera 109 may be configured to photograph a visitor. This is to enable a user to monitor face and behaviors of the visitor.

The aisle camera 109 is a configuration provided to secondly photograph and analyze the image of the face recognized at the entrance camera 103 and determine whether the visitor is dangerous character or not.

When the photographed image at the aisle camera 109 indicates high possibility that the visitor is a dangerous character, the entrance door 102a and the exit door 102b are immediately closed.

The control computer 110 may be configured to compare the facial image photographed by the entrance camera 103 with the image on the list which is provided from the DB server 200 in real-time basis.

The list may include therein a dangerous character directly designated and registered by the user.

Herein, the DB server 200 is configured to constantly update the list and provide the same, and such list may be configured to include lists of drug criminals, sex offenders, heavy offenders, most wanted criminals, those who are barred from leaving country, terrorists, and so on.

The DB server 200 may be configured to provide a list registered at a server of public authority such as national police agency, etc., and may be configured to provide a list which is photographed or registered at another facial recognition security system for private use.

Meanwhile, when the result of comparison described above indicates 60% or more consistency of the photographed image at the entrance camera 103 with a predetermined image on the list, the control computer 110 may be configured to provide an alarm to the user. In response to 60% or more consistency at the entrance camera 103, first, security management staff is notified of this to be on standby. The numeric range such as 60% consistency may be adjusted by the user.

The control computer 110 then determined in advance if the image photographed at the entrance camera 103 has 75% or more consistency with a predetermined image on the list. Again, the numeric range such as 75% consistency may be adjusted by the user.

Notwithstanding the indication of 75% or more consistency, the control computer 110 still guides the visitor, through the entrance display 104 or the entrance speaker 105, to enter into the aisle.

The control computer 110 is so configured that, when the consistency rate is 75% or more and when detecting, by the infrared sensor 106, the entrance of the visitor through the entrance, the control computer 110 controls the entrance door 102a and the exit door 102b to close. In this case, it is ensured that the doors are controlled to be rapidly closed before the visitor exits the aisle.

Accordingly, the visitor, who is identified as a dangerous character, is locked in the blocking aisle and security staff or police can easily arrest the dangerous character.

Meanwhile, the control computer 110 analyzes the facial image of the visitor photographed by the entrance camera 103, and when determining that the visitor is wearing a hat or sunglasses, or inclining his or her head based on the analysis result, the control computer 110 may control the entrance display 104 and the entrance speaker 105 to output instruction directing to take off the hat or sunglasses, or to raise his/her head.

The control computer 110 may be configured to control so that the entrance camera 103 secondly photographs the face of the visitor, after the visitor takes off the hat or sunglasses.

Meanwhile, while the control computer 110 may be used for blocking or controlling access of dangerous characters, alternatively, the control computer 110 may also be used for separately storing a list of people with authorization to access government complex, the Blue House or other public institutions, or convention centers, and accepting/denying access using the same.

In the above example, the control computer 110 may photograph a facial image of the visitor and compare the same with a corresponding list, and since the authorized visitor can change in appearance over time, the control computer 110 may be configured to update the photographed image of the visitor's face periodically at intervals such as 1 year, two years, etc.

In the above example, updated photographs on the list at 1 or 2 year-intervals can increase image recognition rate.

The control computer 110 may be configured such that, when the consistency rate based on the image comparison is dropped to below a predetermined threshold, the control computer 110 controls so that the image newly photographed by the entrance camera 103 or the aisle camera 109 is automatically updated to the list. For example, over time, the consistency rate may drop from 90% to 70%, in which case the image of the list may be updated with the recent image of the corresponding visitor. In this example, the corresponding visitor does not have to update and register his or her image repeatedly and manually.

Figure 3:
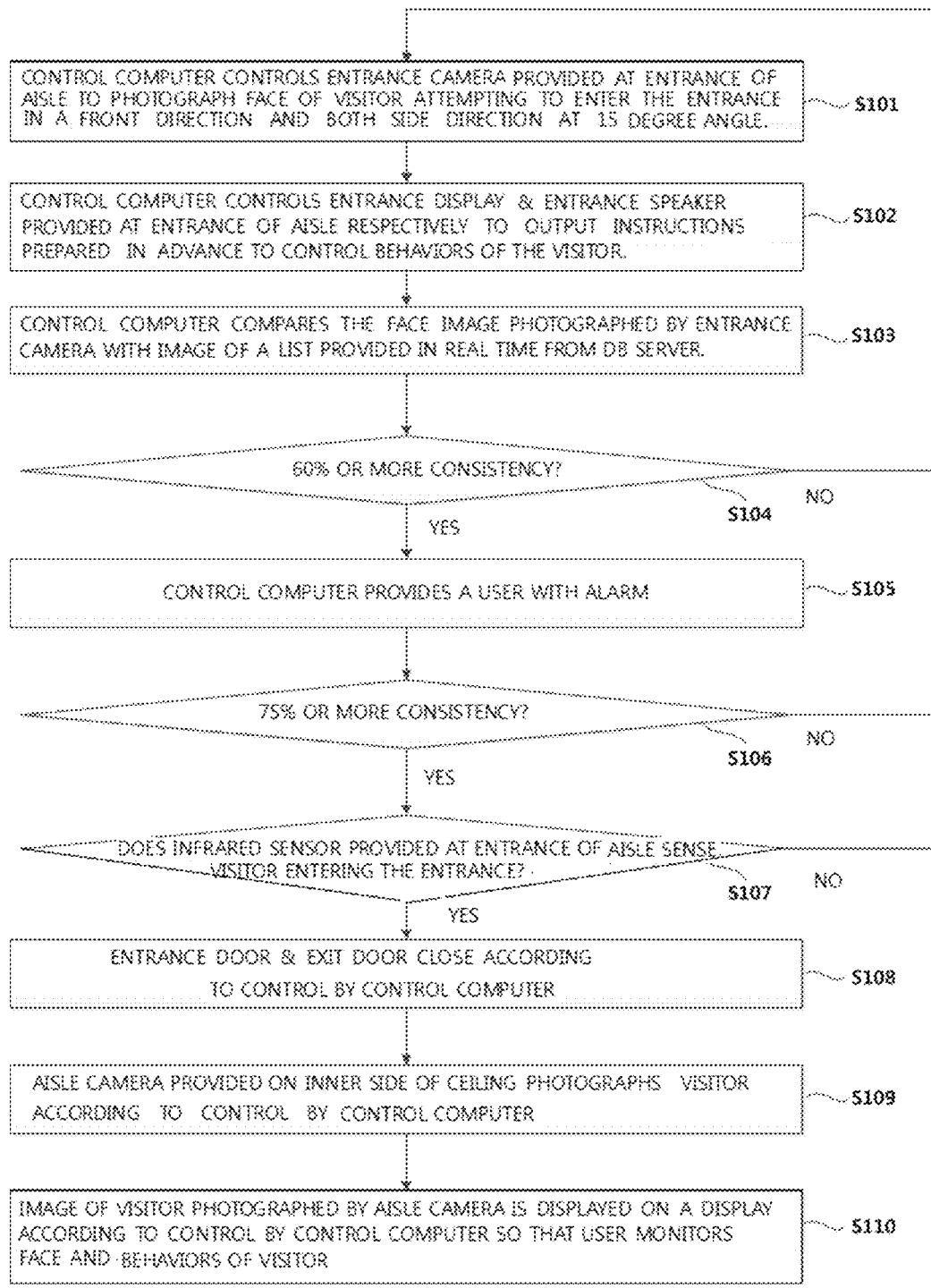
FIG. 3 is a flowchart of a security entrance and exit control method using a blocking aisle according to an exemplary embodiment.

FIG. 3 is a flowchart of a security entrance and exit control method using a blocking aisle according to an exemplary embodiment.

The security entrance and exit control method according to the present disclosure is mainly applicable for use at the entrances of airports, harbors, train stations, public offices, military facility, schools, kindergartens, universities, sports arena such as baseball stadium, large buildings, conventions centers, and so on.

In an example, by forming one blocking aisle at the entrance with a pair of protective walls 101a and a ceiling 101b, and an entrance door 102a and an exit door 102b on both ends thereof, the entrance can be configured to allow stricter access control, and easy control and arrest of a suspicious person.

The aisle is preferably formed to have a length from 2.0 m to 5.0 m.

The ceiling 101b forming the aisle preferably further includes an aisle light 107 and an aisle speaker 108 to output voice of a user, on an inner side thereof.

Preferably, the entrance door 102a is formed from steel plate or reinforced plastics, the exit door 102b is formed from reinforced plastics, reinforced glass or bulletproof glass, and tinted to allow one outside the aisle to see inside the aisle, while blocking one inside the aisle from seeing outside the aisle.

Each step of operation will be described in detail below.

First, at S101, the control computer 110 controls the entrance camera 103 provided at an entrance of the aisle to photograph a face of a visitor attempting to enter the entrance from a front direction and at an angle of 15 degrees from both sides.

Next, at S102, the control computer 110 controls the entrance display 104 and the entrance speaker 105 provided at the entrance of the aisle to output instruction prepared in advance to control the behaviors of the visitor, respectively.

In this case, the control computer 110 may be configured to analyze the face image of the visitor as photographed by the entrance camera 103. When the analysis result indicates that the visitor is wearing a hat or sunglasses, or inclining his/her head down, the control computer 110 may be configured to output instructions directing to take off the hat or sunglasses or raise the visitor's head through the entrance display 104 and the entrance speaker 105, and control the entrance camera 103 to secondly photograph the face of the visitor.

Next, at S103, the control computer 110 compares the image of the face photographed by the entrance camera 103 with the image of the list provided from the DB server 200 in real-time basis, and at S104 and S106, determines if the images are consistent by 60% or more, and 75% or more, respectively.

The list may preferably include at least one of criminals, terrorists, and most wanted criminals.

In an example, at S104, when the comparison result indicates 60% or more consistency of the image photographed by the entrance camera 103 with a predetermined image on the list, at S105, the control computer 110 provides the user with an alarm. This is to allow the user to get prepared for the possibility that the visitor is a dangerous character.

Next, at S107, as the visitor is guided according to the instructions outputted from the entrance speaker 104 to enter the entrance, at S107, the infrared sensor 106 provided at the entrance of the aisle senses is the visitor enters into the entrance.

In an example, at S106, when the previous comparison result indicates 75% or more consistency of the image photographed by the entrance camera 103 with the predetermined image of the list, and at S107, when sensing by the infrared sensor 106 the visitor entering into the entrance, at S108, the entrance door 102a and the exit door 102b are closed under control of the control computer 110.

Next, at S109, under control of the control computer 110, the aisle camera 109 provided on the inner side of the ceiling 101b of the aisle photographs the visitor.

Next, at S110, the control computer 110 displays an image of the visitor photographed by the aisle camera 109 on the display to allow the user to analyze the face of the visitor and observe the visitor's behaviors in more detail.

The foregoing embodiments and advantages are merely exemplary and are not to be construed as limiting. The present teaching can be readily applied to other types of apparatuses. Also, the description of the embodiments is intended to be illustrative, and not to limit the scope of the claims, and many alternatives, modifications, and variations will be apparent to those skilled in the art.

INDUSTRIAL APPLICABILITY

The present disclosure relates to a security entrance and exit control system and method using a blocking aisle, and is applicable as an entrance/exit management and control system at an airport, a harbor, a building, and so on.

The invention claimed is:

1. A security entrance and exit control system installed at an entrance of any one of airport, harbor, train station, public office, and military facility, comprising:
   a pair of protective walls and a ceiling for forming an aisle which is 2.0 m-5.0 m in length;
   an entrance door and an exit door provided at both ends of the aisle;
   a plurality of entrance cameras provided at the entrance of the aisle so as to photograph a face of a visitor attempting to enter the entrance, in a front direction and in both side directions at a 15 degree angle;
   an entrance display provided at the entrance of the aisle so as to output an instruction prepared in advance to control behaviors of the visitor;
   an entrance speaker provided at the entrance of the aisle so as to output the instruction displayed on the entrance display as a voice;
   an infrared sensor provided at the entrance of the aisle so as to sense that the visitor has entered the entrance;
   an aisle light provided on the inner side of the ceiling;
   an aisle speaker provided on the inner side of the ceiling so as to output a voice of a manager;
   an aisle camera provided on the inner side of the ceiling so as to photograph the visitor inside the aisle; and
   a control computer which analyzes an image of the face photographed by the entrance cameras, and when determining that the visitor is wearing a hat or sunglasses or inclining head, outputs a message "facial recognition failed" on a monitor of the manager and controls the entrance display and the entrance speaker to output an instruction directing to take off the hat or the sunglasses or raise head, and controls the entrance camera to secondly photograph the face of the visitor, compares the image of the face photographed by the entrance camera with an image of a list provided in real time from a DB server, and provides an alarm to the manager if the photographed image is consistent with a predetermined image of the list by 60% or more according to the comparison result, controls such that the entrance door and the exit door close when it is sensed by the infrared sensor that the visitor enters the entrance if the photographed image is consistent with the predetermined image by 75% or more according to the comparison result, and displays, on a display, an image of the visitor photographed by the aisle camera such that the manager monitors the face and the behaviors of the visitor, wherein:

the entrance door is formed from opaque steel plate or reinforced plastics;

the exit door is formed from reinforced plastics, reinforced glass or bulletproof glass, and tinted so that one outside the aisle sees inside the aisle, while one inside the aisle does not see outside the aisle;

the pair of protective walls and the ceiling are formed from opaque steel plate or reinforced plastics;

the list comprises at least one of criminals, terrorists, and most wanted criminals; and the control computer is configured to control such that when the image is consistent by 75% or more according to the comparison result, the currently-photographed image is automatically updated by being added to the DB server in real time for the purpose of management of an image version, in case of having deteriorated consistency rate compared to a usual recognition result.

2. A security entrance and exit control method using a blocking aisle of an entrance of any one of airport, harbor, train station, public office, and military facility, the method comprising:

controlling, at a control computer, an entrance camera provided at an entrance of the aisle to photograph a face of a visitor attempting to enter the entrance, in a front direction and in both side directions at a 15 degree angle;

controlling, at the control computer, an entrance display and an entrance speaker provided at the entrance of the aisle so as to output an instruction prepared in advance to control behaviors of the visitor, respectively;

comparing, at the control computer, an image of the face photographed by the entrance cameras with an image of a list provided in real time from a DB server to determine if the photographed image is consistent by 60% or more, and by 75% or more;

when the image of the face photographed by the entrance cameras is consistent with a predetermined image of the list by 60% or more, providing, by the control computer, an alarm to a manager;

sensing, at an infrared sensor provided at the entrance of the aisle, that the visitor enters the entrance, when the visitor enters the entrance according to the instruction outputted from the entrance speaker;

when the image photographed by the entrance camera is consistent with the predetermined image of the list by 75% or more, and when sensing, by the infrared sensor, that the visitor enters the entrance, closing an entrance door and an exit door according to control of the control computer before the visitor exists the aisle;

photographing, at an aisle camera provided on an inner side of a ceiling of the aisle, the visitor under control of the control computer; and displaying, at the control computer, an image of the visitor photographed by the aisle camera such that the manager monitors the face and the behaviors of the visitor, wherein:

the aisle is configured to a length of 2.0 m-5.0 m by a pair of protective walls and a ceiling, and the entrance door and the exit doors are provided at both ends of the aisle;

the ceiling further comprises an aisle light and an aisle speaker which outputs a voice of the manager, on an inner side;

the entrance door is formed from opaque steel plate or reinforced plastics;

the exit door is formed from reinforced plastics, reinforced glass or bulletproof glass, and tinted so that one outside the aisle sees inside the aisle, while one inside the aisle does not see outside the aisle;

the list comprises at least one of criminals, terrorists, and most wanted criminals;

the controlling, at the control computer, the entrance camera and the entrance speaker provided at the entrance of the aisle so as to output the instruction prepared in advance to control the behaviors of the visitor, respectively comprises analyzing, at the control computer, the image of the face of the visitor photographed by the entrance camera and when determining as a result of the analysis that the visitor is wearing a hat or sunglasses or inclining his/her head, outputting a message "facial recognition failed" on a monitor of the manager, controlling the entrance display and the entrance speaker to output an instruction directing to take off the hat or the sunglasses or raise head, and controlling the entrance camera to secondly photograph the face of the visitor; and the closing the entrance door and the exit door according to control of the control computer before the visitor exists the aisle, when the image photographed by the entrance camera is consistent with the predetermined image of the list by 75% or more, and when sensing, by the infrared sensor, that the visitor enters the entrance, comprises when the photographed image is consistent by 75% or more according to the comparison result, controlling such that the currently-photographed image is automatically updated by being added to the DB server in real time for the purpose of management of an image version, in case of having deteriorated consistency rate compared to a usual recognition result.

* * * * *